United States Patent [19]

Cohen et al.

[11] Patent Number: 5,761,680

[45] Date of Patent: Jun. 2, 1998

[54] COHERENT FILM SYSTEM ACCESS DURING DEFRAGMENTATION OPERATIONS ON A STORAGE MEDIUM

[75] Inventors: Leonardo Cohen, Los Angeles; Mark Kevin Kennedy, Redondo Beach, both of Calif.

[73] Assignee: Symantec Corporation, Cupertino, Calif.

[21] Appl. No.: 919,752

[22] Filed: Aug. 28, 1997

Related U.S. Application Data

[63] Continuation of Ser. No. 518,674, Aug. 23, 1995, abandoned.

[51] Int. Cl.[6] ........................................................ G06F 17/30
[52] U.S. Cl. ................................................ 707/206; 395/670
[58] Field of Search .............................. 395/670; 707/206

[56] References Cited

U.S. PATENT DOCUMENTS

| | | | |
|---|---|---|---|
| 4,827,462 | 5/1989 | Flannagan et al. | 369/32 |
| 5,119,291 | 6/1992 | Flanagan et al. | 395/275 |
| 5,237,681 | 8/1993 | Kagan et al. | 395/615 |
| 5,241,635 | 8/1993 | Papadopoulos et al. | 395/375 |
| 5,339,430 | 8/1994 | Lundin et al. | 395/700 |
| 5,347,632 | 9/1994 | Filepp et al. | 395/200.32 |
| 5,361,359 | 11/1994 | Tajalli et al. | 395/186 |
| 5,423,034 | 6/1995 | Cohen-Levy et al. | 395/610 |
| 5,467,473 | 11/1995 | Kahle et al. | 395/800 |
| 5,479,656 | 12/1995 | Rawlings, III | 395/616 |
| 5,504,883 | 4/1996 | Coverston et al. | 395/618 |
| 5,544,360 | 8/1996 | Lewak et al. | 395/601 |
| 5,551,020 | 8/1996 | Flax et al. | 395/612 |
| 5,553,235 | 9/1996 | Chen et al. | 395/182.18 |
| 5,574,907 | 11/1996 | Jernigan et al. | 395/601 |
| 5,584,007 | 12/1996 | Ballard | 395/440 |
| 5,652,865 | 7/1997 | Rawlings, III | 395/497.02 |

OTHER PUBLICATIONS

"Strategies for better disc farm management" by Shiers, Jamie Feb. 1990, Dialog Computer Database Supplier #:08213556.

"The Ins and Outs of File I/O" by Esbensen, D2/1990, Dec Professional, *(p. 13 advertisement only; not a missing page).

"High Level Dynamic Memory Management For" by Nilsen, K. 1996, Assoc. For Computing Machinery, New York, NY.

"How to Improve Mebes–iii Write" Bodi, G., 1995 The Society; Bellingham, WA.

*Primary Examiner*—Lucien U. Toplu
*Assistant Examiner*—Alice Park
*Attorney, Agent, or Firm*—Fliesler, Dubb, Meyer & Lovejoy LLP

[57] ABSTRACT

A file defragmentation utility for a computer system is disclosed that enables multithreaded preemptive multitasking during file defragmentation. The utility includes a defragmentor routine that defragments clusters or portions of a file on a storage media and then updates one or more file system structures to indicate the new locations of the defragmented clusters of the file. An alias driver is provided that traps accesses to the file and that maintains coherent access to the file while the file system structures are updated.

30 Claims, 6 Drawing Sheets

| (FAT) File Allocation Table | Directory Structure (DIR) | Swap File A 100 | Swap File B 101 | File 102 | File 103 | File 104 | Swap File C 105 |
|---|---|---|---|---|---|---|---|
| 106 File | 107 File | 109 File | 110 File | 111 File | 112 Swap File E | 113 File | 114 File |
| | 108 Swap File D | | | | | | |
| Swap File Clone A 115 | Swap File Clone B 116 | Swap File Clone C 117 | Swap File Clone D 118 | Swap File Clone E 119 | | | |

COHERENT FILM SYSTEM ACCESS DURING DEFRAGMENTATION OPERATIONS ON A STORAGE MEDIUM

This application is a continuation of Ser. No. 08/518,674, filed Aug. 23, 1995, now abandoned.

BACKGROUND OF THE INVENTION

1. Field of the Invention

The present invention pertains to the fields of computer systems and software. More particularly, this invention relates to mechanisms for defragmenting files contained on storage media while enabling coherent, multithreaded access to the files during defragmentation operations.

2. Art Background

Prior computer systems, such as personal computer systems, typically perform a wide variety of specialized tasks. Such specialized tasks are usually implemented within a variety of individual application programs. Typically, such application programs are loaded into and executed from a primary physical memory of the computer system. Such primary physical memory usually comprises dynamic random access memory (DRAM).

Typically, each application program requires a corresponding allocation of memory space in the computer system for code and data storage. In addition, prior computer operating systems usually allocate memory space for multiple application programs.

However, computer systems usually contain a relatively limited amount of primary physical memory in comparison to the memory requirements of one or more application programs. Such limitations on DRAM capacity typically lowers the overall hardware cost of such a computer system. As a consequence, the physical memory in such a computer system is usually shared among portions of individual application programs on a dynamic basis.

Prior computer systems typically implement virtual memory mechanisms that enable the limited capacity physical memory to appear as a much larger virtual memory address space to the individual application programs. Such mechanisms usually enable the sharing of physical memory among multiple application programs on a demand driven basis.

Typically, such a virtual memory address space includes the physical memory of the computer system along with a swap file contained on a mass storage media such as a disk drive. Such a swap file typically provides a secondary storage for the virtual memory address space. The memory pages of individual application programs are typically swapped between the physical memory and the swap file in a manner transparent to individual applications.

Such a swap file typically grows and shrinks after computer system startup as application programs are installed, executed, and removed from the computer system. In additions other types of computer system files on the same mass storage media are typically created and modified by the operating system and application programs as the swap file grows and shrinks.

As a consequence, computer system files including the swap file typically become fragmented and scattered throughout random portions of the storage media during normal operations. Unfortunately, such fragmentation of files on the storage media increases the input/output time required to fetch files from the storage media into the physical memory. Such increased input/output delays typically slow the overall performance of such a computer system.

Prior software utilities exist that perform defragmentation functions on individual files contained on the storage media. Such a defragmentation utility typically copies the scattered portions of individual files to contiguous areas of the storage media. Thereafter, the software utility usually updates the file system structures that enable the operating system to properly access the new locations of the defragmented files.

In addition, prior operating systems usually provide services that allow software utilities or drivers to lock out all access to individual volumes on the storage medial. Such a lock out service allows a defragmentation utility to copy defragmented files to contiguous areas of the media and update the file system structure while locking out conflicting file accesses by the operating system or application programs. Such a locking mechanism usually enables a defragmentation utility to maintain the coherency of the file system during defragmentation.

More recently evolved operating systems for computer systems, however, provide multithreaded, preemptive multitasking of individual application programs executing on the computer system. One such recently evolved operating system is Windows 95 which is available from Microsoft Corporation of Redmond, Washington. While Windows 95 provides a level 3 locking service that prevents accesses to most types of files, such a locking service cannot be used to lock out access to certain types of files such as the swap file. An operating system such as Windows 95 must be able to access the swap file at any time in order to provide virtual memory support to application programs and prevent a lockup in the computer system. Any attempt to defragment the swap file may conflict with swap file accesses by the operating system in a preemptive multitasking environment. Such conflicting accesses to the swap file can cause incoherency of swap file information with catastrophic results for the operating system.

Thus, a preemptively multitasked multithreaded operating system such as Windows 95 simply does not allow locking and defragmenting of the swap file. As a consequence, the swap file for such a computer system fragments across the storage media as the computer system operates from startup or boot time. Such fragmentation of the swap file typically slows the overall execution performance of such a computer system by increasing input/output access times to the swap file during virtual memory paging operations. For example, fragmentation of the swap file on a rotating magnetic disk usually increases the "seek" time for the disk when accessing the swap file.

SUMMARY AND OBJECTS OF THE INVENTION

One object of the present invention is to defragment files on a storage media while enabling coherent access to such files during the defragmentation operation.

Another object of the present invention is to enable multithreaded preemptive multi-asking of application programs during defragmentation.

Another object of the present invention is to enable an operating system to coherently access a swap file while the swap file is being defragmented.

A further object of the present invention is to enable coherent access to a defragmented swap file and to update internal data structures maintained by the file system of the operating system that point to the swap file.

These and other objects of the invention are provided by a file defragmentation utility for a computer system that includes a defragmentor routine and an alias driver. The defragmentor routine defragments clusters or portions of the file on a storage media and then updates one or more file system structures to indicate the new locations of the defragmented clusters of the file. The alias driver traps accesses to the rile and maintains coherent access to the file while the file system structures are updated.

Other objects, features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
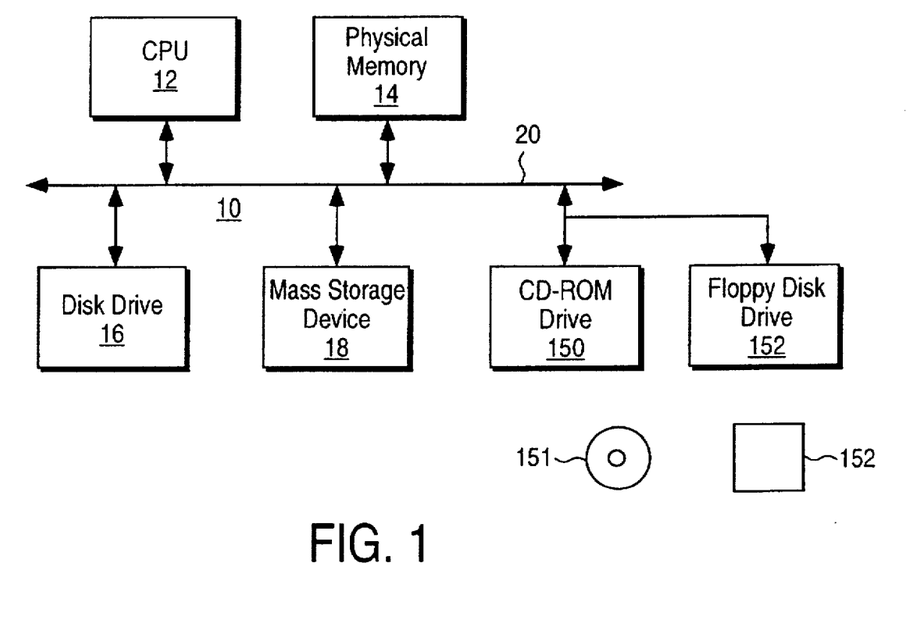
FIG. 1 illustrates the computer system including a central processing unit (CPU) a physical memory, and a disk drive.

FIG. 1 illustrates the computer system 10 for one embodiment. The computer system 10 includes a central processing unit (CPU) 12 a physical memory 14, a disk drive 16 and a mass storage device 18. The computer system 10 also includes a CD-ROM drive 150 that accepts a compact disk 151 containing software and related information and a floppy disk drive 152 that accepts a floppy disk 152 containing software and related information.

The application routines and driver routines disclosed herein may be provided via the compact disk 151 or the floppy disk 152 or a wide-variety of other computer readable storage media including semiconductor based storage media such as flash memory.

For this embodiments the CPU 12 communicates with the disk drive 16 and the mass storage device 18 via host bus 20. However, for other embodiments, the CPU 12 communicates with peripheral devices such as the disk drive 16 and the mass storage device 18 through a variety of input/output interface circuitry including bus bridge circuits that enable communication between the host bus 20 and a variety of standardized peripheral buses.

For one embodiment the CPU 12 conforms to an Intel compatible microprocessor architecture that provides mechanisms that support virtual memory, including mechanisms for detecting page faults during accesses to the physical memory 14 by the CPU 12. In addition, the CPU 12 implements a virtual 8086 mode according to the Intel compatible microprocessor architecture that enables software compatibility with application programs developed for Microsoft Corporation's DOS operating system.

The disk drive 16 provides a rotating magnetic media mass storage for large scale code and data storage for the computer system 10. The mass storage device 18 is intended to represent a variety of other mass storage media such as flash memory subsystems that may also contain fragmented files.

Figure 2:
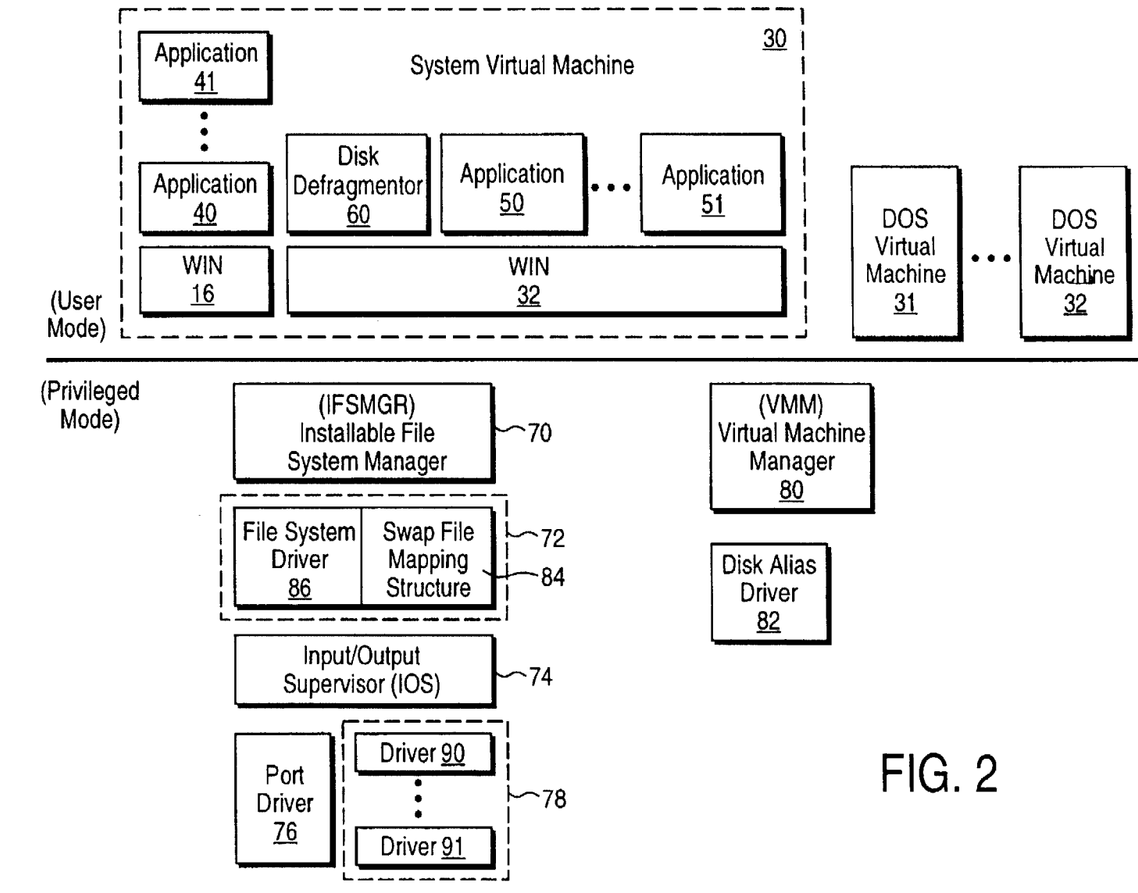
FIG. 2 illustrates a software architecture of the computer system which is generally divided into application programs that execute in a user mode of the CPU and operating system components that execute in a privilege mode of the CPU.

FIG. 2 illustrates a software architecture of the computer system 10 for one embodiment. The software architecture of the computer system 10 is generally divided into application programs that execute in the Ring 3 user mode of the CPU 12 and operating system components that execute in the Ring 0 privileged mode of the CPU 12. The software architecture shown generally illustrates portions of the Windows 95 operating system model.

The application programs executing in the user mode of the CPU 12 include a set of virtual machines 30–32. A virtual machine manager 80 which executes in the privilege mode of the CPU 12 preemptively multitasks the virtual machines 30–32.

The virtual machine 30 is referred to as the system virtual mach-:e.. The system virtual machine 30 includes a 16 bit window subsystem (WIN16) that enables execution of application programs written to conform to 16 bit Microsoft Windows such as application programs 40–41. The virtual machine 30 also includes a 32 bit windows subsystem (WIN32) that enables execution of application programs compatible with 32 bit Microsoft Windows including applications 50–51 and a disk defragmentor 60.

The disk defragmentor 60 is an application program for the WIN 32 subsystem that optimizes the performance of the disk drive 16 and therefore the computer system 10 by defragmenting files on the disk media of the disk drive 16. The virtual machines 31–32 each comprise a disk operating system (DOS) virtual machine for execution of DOS compatible application programs on the computer system 10.

The operating system for the computer system 10 maintains files on the disk drive 16 or the mass storage device 18 using a set of software elements 70–78. The software elements 70–78 are each implemented as virtual device drivers under Windows 95 and are arranged to present to a driver model to the virtual machine manager 80.

The installable file system manager 70 maintains an abstraction of the computer system 10 file system and communicates with the file system module 72. The file system module 72 includes a file system driver 86 that enables reading and writing of individual sectors of the disk drive 16. The file system driver 86 maintains a file system structure for the computer system 10 including a file allocation table and a directory structure on the disk drive 16. For one embodiment, the file system driver 86 maintains a virtual file allocation table (VFAT) file structure.

For one embodiment, the file system module 72 also includes a swap file mapping structure 84 that indicates the locations of clusters of the swap file on the disk drive 16 or the mass storage device 18. For such an embodiment for Windows 95, the file system 72 initializes the swap file mapping structure 84 at system boot time and updates the swap file mapping structure 84 as the swap file on the disk drive 16 grows and shrinks and fragments during normal operations. The swap file mapping structure 84 is never updated by a search of the file allocation table and directory structure the disk drive 16 because the file system 72 for Windows 95 "assumes" that the swap file will never be relocated or defragmented.

The file system driver 86 transfers information to and from the disk drive 16 through an input/output supervisor 74. The input/output supervisor (IOS) 74 provides IOS services that in turn communicate with the disk drive 16 hardware through either a monolithic port driver 76 or a device driver stack 78. The device driver stack 78 implements a stack of device driver calling routines 90-91.

Figure 3:
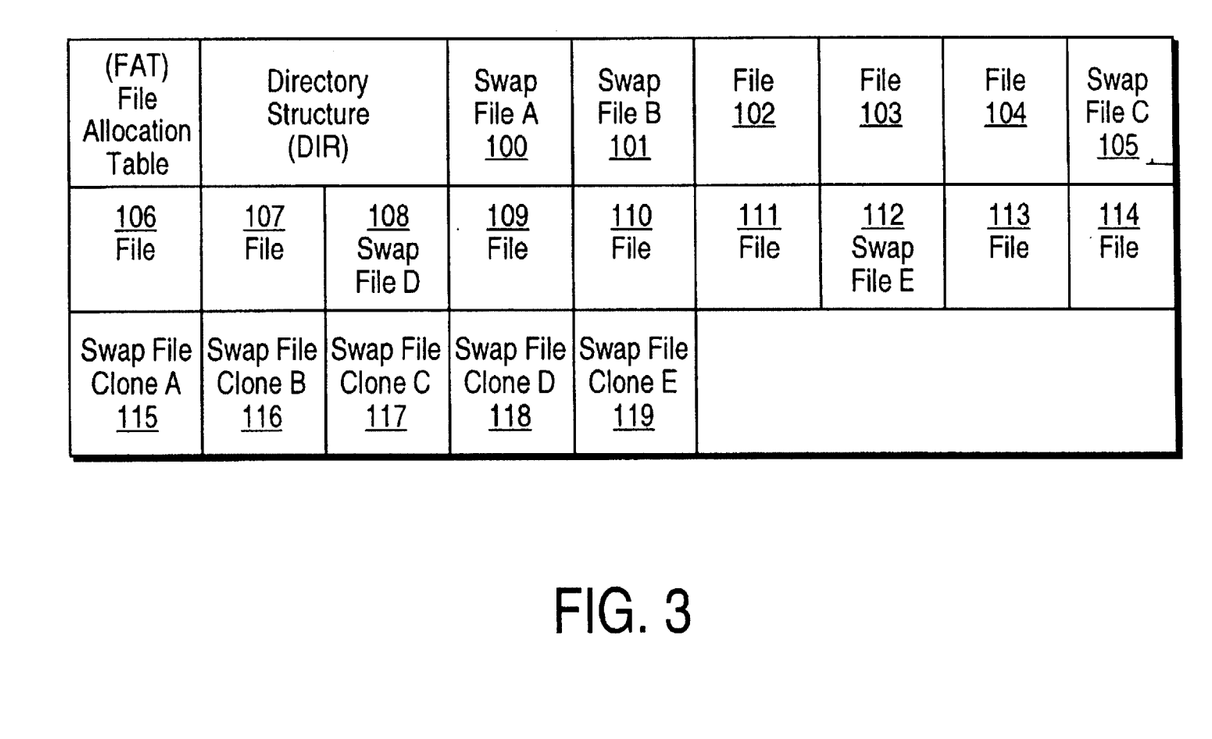
FIG. 3 represents an example layout of information or the storage media of the disk drive wherein the file system logically divides the storage media into a series of clusters.

FIG. 3 represents an example layout of information on the storage media provided disk drive 16. The file system 72 logically divides the storage media of the disk drive 16 into a series of clusters For purposes of this illustration, only the clusters 100-119 are shown.

For one embodiment, the disk drive 16 contains a file allocation table (FAT) and a directory structure (DIR) which provide the file system structure for the computer system 10. The directory structure stores starting cluster numbers For individual files on the disk drive 16 and the file allocation table provides a link list of cluster numbers that enable the file system driver 86, in one embodiment VFAT, and the file system 72 to properly locate individual files on the disk drive 16.

An example swap file is shown comprising swap file portions or clusters A-E. Swap file portion A is stored in the cluster 100 of the disk media and swap file portion B is stored in the cluster 101 of the disk media of the disk drive 16. As shown, the swap file portions A-E are scattered over various clusters of the disk media. In this example, the swap file portions A-E are scattered through the clusters 100, 101, 105, 108 and 112 of the disk media of the disk drive 16.

The disk defragmentor 60 defragments the swap file portions A-E by copying or cloning the swap file portions A-E over to a series of contiguous clusters, in this example clusters 115-119 of the disk media of the disk drive 16. Thereafter, the disk defragmentor 60 updates the file allocation table and the directory structure to reflect the new location of the swap file portions A-E.

The disk defragmentor 60 obtains the assistance of a disk alias driver 82 which executes in the privileged mode of the CPU 12. The disk defragmentor 60 dynamically loads the disk alias driver 82 into the physical memory 82 as needed. For one embodiment for Windows 95, the disk alias driver 82 is a linear executable file that the operating system loader marks as non-pageable. The linear page lock of the disk alias driver 82 prevents preemption during certain atomic operations of the disk alias driver 82. The disk alias driver 82 is installed as a virtual device driver and is accessed by the disk defragmentor 60 through WIN 32 device I/O control (DIocontrol) calls.

The disk alias driver 82 traps, monitors, and under certain conditions translates file system accesses to the swap file. The translation of swap file accesses provides coherent swap file information during defragmentation and until the file allocation table and the directory structure on the disk drive 16 are updated to indicate the proper location of the defragmented swap file. For one embodiment, the disk defragmentor 60 also uses the disk alias driver 82 to update the swap file mapping structure 84 to properly indicate to the file system driver 86 the new location of the defragmented swap file. This update of the swap file structure is necessary for a Windows 95 embodiment in which defragmentation of the swap fire is assumed not to ever occur.

Figure 4:
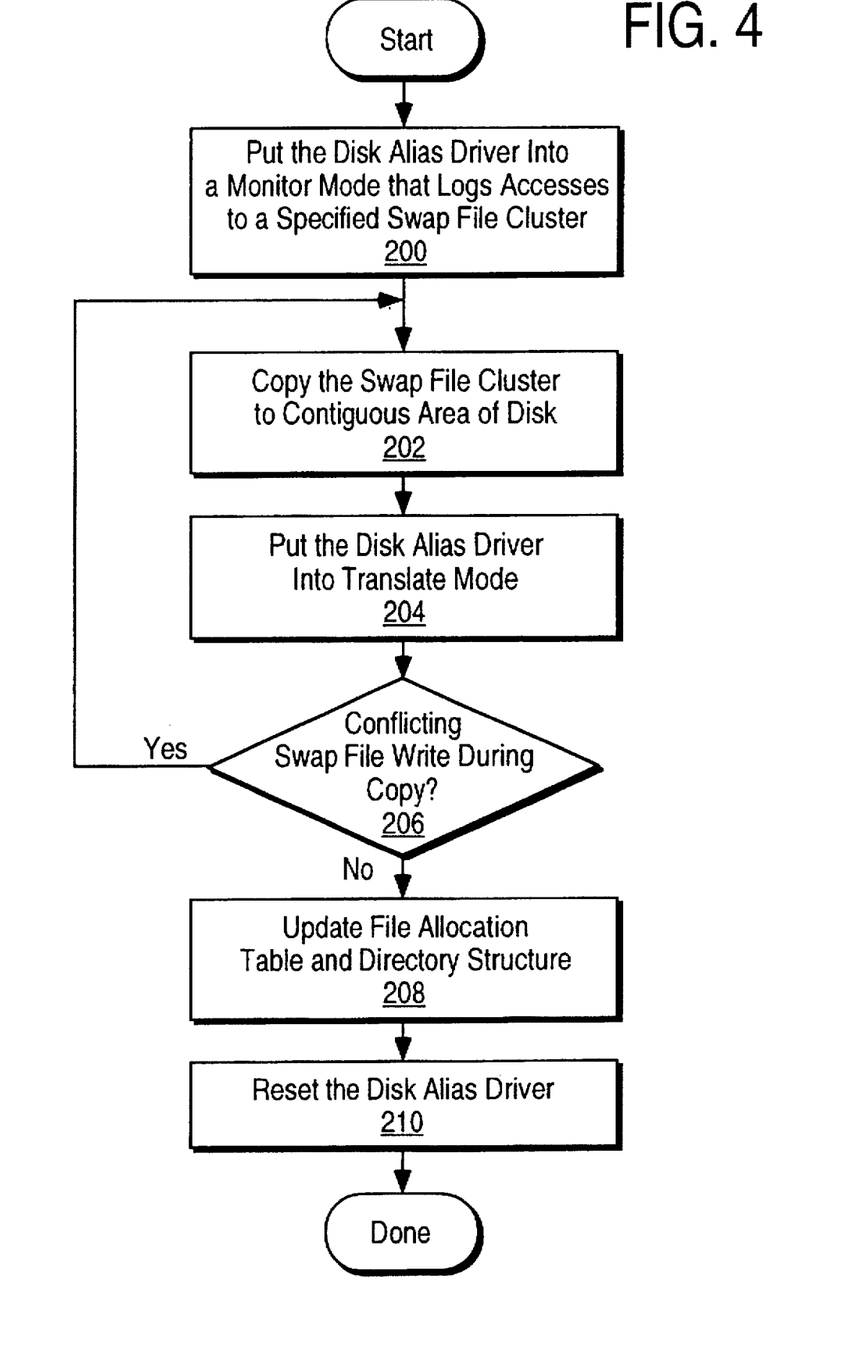
FIG. 4 is a flow diagram that illustrates the functions of the disk defragmentor during defragmentation operations on a particular cluster of the swap file.

FIG. 4 is a flow diagram that illustrates the functions of the disk defragmentor 60 during defragmentation operations on a particular cluster of the swap file. The disk defragmentor 60 employs the assistance of a monitor mode and a translate mode of the disk alias driver 82 to maintain swap file coherency while the particular swap file cluster is cloned and the appropriate file system structures are updated.

At block 200, the disk defragmentor 60 puts the disk alias driver 82 into the monitor mode. While in the monitor mode, the disk alias driver 82 records or logs accesses to a specified area of the storage media of the disk drive 16. In this case, the specified area corresponds to a particular cluster of the swap file that must be cloned during defragmentation. The disk defragmentor 60 generates a call to the disk alias driver 82 wherein the call specifies the monitor mode and includes parameters that specify the portion of the disk media of the disk drive 16 being monitored. For one embodiment, the monitor call to the disk alias driver specifies a sector and delta value in units compatible with the input/output supervisor 74.

At block 202, the disk defragmentor 60 copies the particular swap file portion or cluster to an appropriate contiguous area of the disk drive 16.

Thereafter, at block 204 the disk defragmentor 60 puts the disk alias driver 82 into a translate mode. While in the translate mode, if there had been no conflicting writes logged, the disk alias driver 82 redirects accesses targeted for the old cluster of the swap file to the newly cloned cluster generated at block 202. The disk defragmentor 60 generates a call to the disk alias driver 82 wherein the call specifies the translate mode and includes parameters that specify the sectors and delta values that contain the old and the new swap file clusters.

At decision block 206, the disk alias driver 82 returns an indication of whether a conflicting swap file access occurred or was logged while the disk alias driver 82 was in the monitor mode. Such a conflicting swap file access indicates that the newly cloned cluster of the swap file contains stale data. If the disk alias driver 82 returns the indication of the conflicting swap file access, then control proceeds back to block 202 to retry the clone operation on the particular swap file cluster. Otherwise, control proceeds to block 208.

At block 208, the disk defragmentor 60 updates the file allocation table and directory structure stored on the disk drive 16. Thereafter at block 210, the disk defragmentor 60 resets the disk alias driver 82 which causes the disk alias driver 82 to leave the translate mode and to remove hooks into the input/output supervisor 74 used to trap IOS commands. At this point, the translation functions of the disk alias driver are no longer required because the file allocation table and the directory structure and other relevant structures for the file system 72 have been properly updated to reflect the location of the defragmented swap file cluster.

Figure 5:
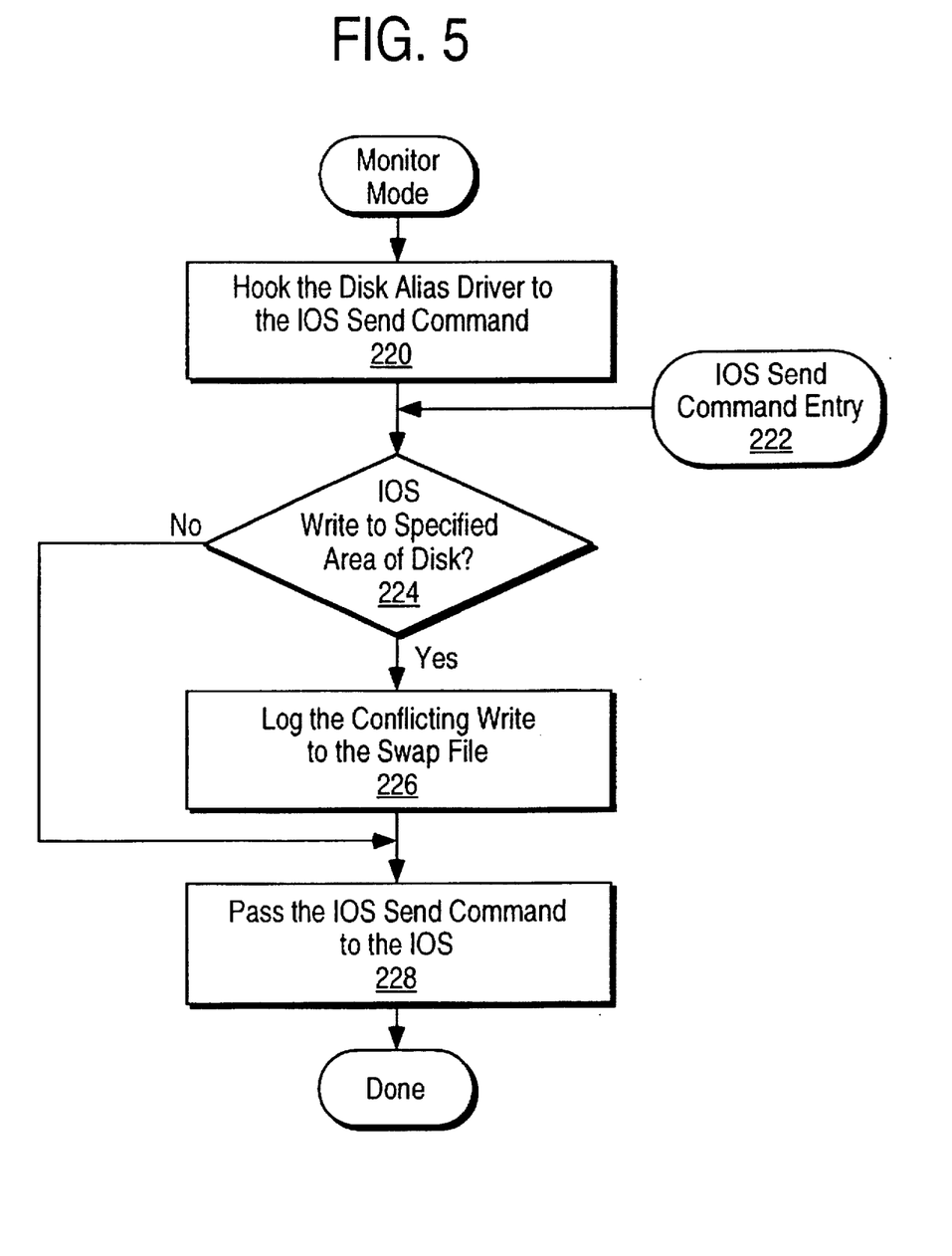
FIG. 5 illustrates the functions of the disk alias driver while in the monitor mode.

FIG. 5 illustrates the functions of the disk alias driver 82 while in the monitor mode. Upon entry into the monitor mode at block 220, the disk alias driver 82 hooks the IOS send command of the input/output supervisor 74.

For one embodiment, the operating system Windows 95 provides a utility that enables virtual device drivers such as the disk alias driver 82 to hook individual services of drivers such as the input/output supervisor 74 The virtual machine manager 80 provides a hook-device-service function that enables the disk alias driver 82 to trap a particular service provided by the input/output supervisor 74, in this case the IOS send command. The hook-device-service function provided by the virtual machine manager 80 inserts a run-time calling address provided by the disk alias driver 82 with the hook-device-service function call into a dispatch table maintained by the virtual machine manager 80. This dispatch table generally includes a list of device drivers and associated services along with dispatch addresses to the appropriate device driver services.

The hook-device-service function provided by the virtual machine manager 80 also returns to the disk alias driver 82 the displaced address for the handler of the IOS send command in the input/output supervisor 74. The virtual device driver 82 saves this displaced address to later pass on the trapped IOS send command and associated parameters to the input/output supervisor 74.

For another embodiment, the disk alias driver 82 inserts itself into the calling sequence of the device driver stack 78. In this embodiments the disk alias driver 82 imitates the device driver interface (DDI) of one of the device drivers in the device driver stack 78. Such an embodiment offers the advantage that only accesses to the disk drive 16 are trapped rather than all accesses routed through the IOS send command of the input/output subsystem 74.

After the installation of the hook at block 220, any IOS send command from the file system driver 86 is trapped to the disk alias driver 82 according to the address provided by the disk alias driver 82 with the hook-device-service call. The trapped IOS send command is directed to block 222 of the disk alias driver 82 while in the monitor mode. At decision block 224, the disk alias driver 82 examines the parameters of the trapped IOS send command to determine whether an IOS write is underway to the area of the disk media being monitored, i.e. the old portion of the swap file being cloned.

For one embodiment, the file system driver 86 passes a set of parameters to the input/output supervisor 74 with the IOS send command. The parameters specify whether the IOS send command is a write and also specify and area of the disk media of the disk drive 16 for the write. The area of the disk media may be specified by a sector number and a delta value or block length offset for that sector. The file system driver 86 compares the area parameters of the IOS send command with the area parameters for the old swap file portion provided with the original call from the disk defragmentor 60 that initiated the monitor mode at block 200.

Figure 6:
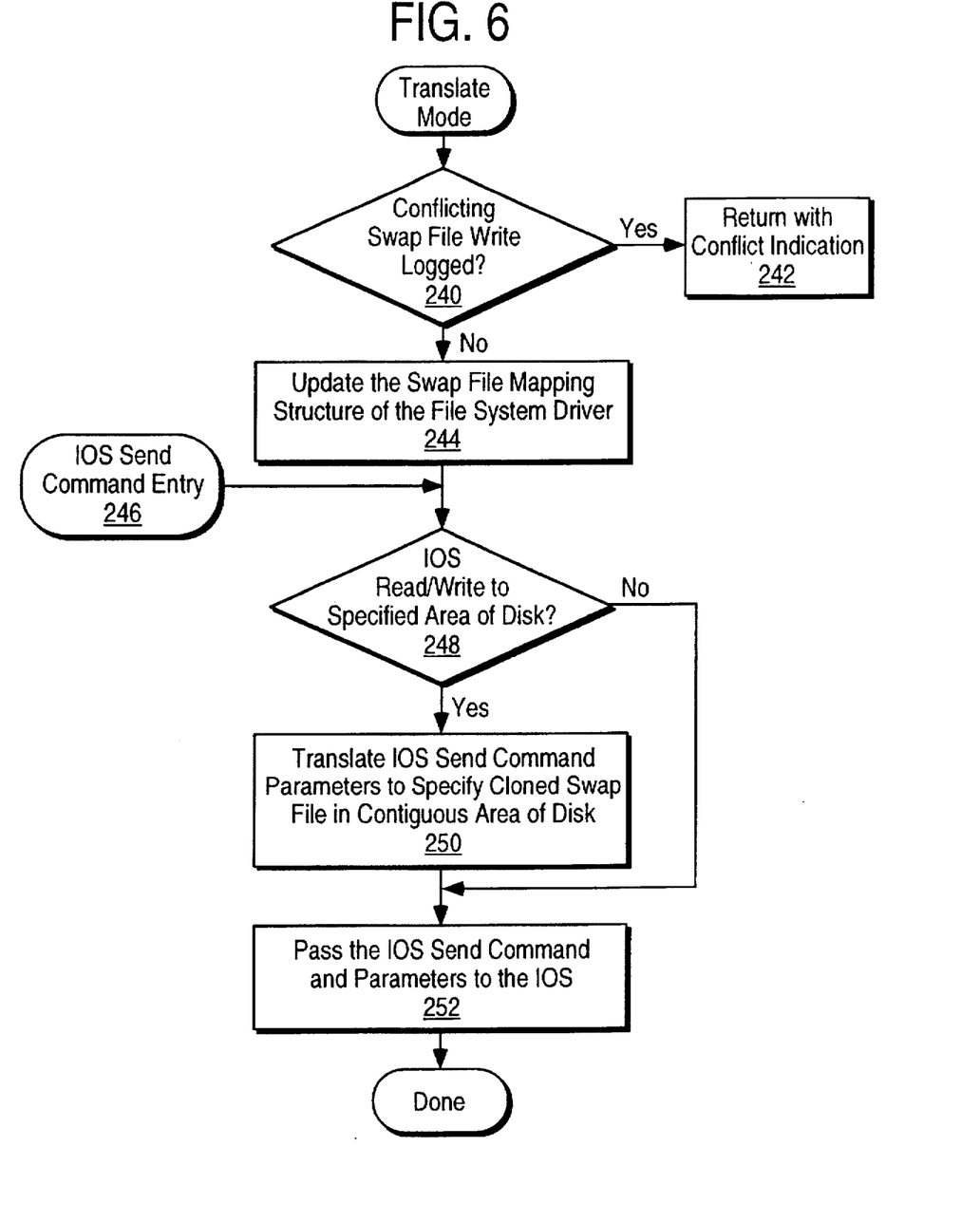
FIG. 6 illustrates the functions of the disk alias driver while in the translate mode.

If the IOS write to the specified area is detected at decision block 224, then control proceeds to block 226. At block 226, the disk alias driver 82 logs that a conflicting write to the swap file has occurred. Thereafter, at block 228 the disk alias driver 82 passes on the IOS send command including the original parameters to the input/output supervisor 74 using the original IOS send command dispatch address obtained through the hook-device-service function FIG. 6 illustrates the functions of the disk alias driver 82 while in the translate mode. At decision block 240, the disk alias driver 82 determines whether a conflicting swap file write was logged while in the monitor mode.

If the conflicting swap file write is found at decision block 240, then control proceeds to block 242. At block 242, the disk alias driver 82 returns to the disk defragmentor 60 with a conflict indication. The conflict indication causes the disk defragmentor 60 to retry the clone operation on the swap file cluster with the conflicting write.

Otherwise control proceeds to block 244. At block 244, the disk alias driver 82 updates the swap file mapping structure 84 maintained by the file system driver 86. The updated swap file mapping structure 84 thus indicates the new location of the cloned portion of the swap file on the contiguous area of the disk drive 16.

With the IOS send command hook still installed, any IOS send commands from the file system driver 86 are trapped to the disk alias driver 82 and are directed to block 246 while in the translate mode. Then at decision block 248, the disk alias driver 82 determines whether the trapped IOS write command specifies a read or, write to the old swap file portion that was recently cloned to a contiguous area of the disk drive 16. This determination is made by comparing the sector and delta value write parameters of the trapped IOS send command with the sector and delta value parameters of the old swap file cluster.

If the trapped IOS send command does specify a read or write to the old portion of the swap file, then control proceeds to block 250. At block 250, the disk alias driver 82 translates the trapped IOS send command parameters to specify the contiguous area of the disk drive 16 that contains the newly cloned portion of the swap file. Accordingly, the sector and delta value parameters for the new swap file cluster are substituted for the sector and delta value parameters originally provided by the trapped IOS send command. Thereafter, at block 252 the disk alias driver 82 passes the IOS send command including modified parameters down to the input/output subsystem 74 to properly access the newly cloned portion of the swap file in the contiguous area of disk drive 16.

If the trapped IOS send command is not a read or write targeted for the old swap file cluster at decision block 248, then control proceeds to block 252 to pass the IOS send command including unmodified parameters to the input/output supervisor 74 in a normal manner.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A file defragmentation system for use in a computer system wherein control may be pre-emptively taken away from executing programs, said system comprising:

a defragmentor program that during execution defragments a file on a storage media and then updates a file system structure to indicate one or more new locations on the storage media for the defragmented file, said defragmentor program being susceptible to having control pre-emptively taken away from it during said execution; and     an alias driver that traps accesses to the file during said defragmentation and before said updating of the file system structure completes, and that maintains coherent access to data of the defragmented file until said updating of the file system structure completes.

2. The file defragmentation system of claim 1, wherein: said computer system includes a file system driver by way of which file portions are read and written and an input/output supervisor through which the file system driver interfaces with the storage media; and     the alias driver hooks to an input/output system send command sent from the file system driver to the input/output supervisor.

3. The file defragmentation system of claim 1, wherein said computer system includes a stack of device drivers each having a device driver interface (DDI); and     the alias driver is inserted into a calling sequence of said device drivers so as to imitate the DDI of a particular one of the device drivers that corresponds to the storage media.

4. The file defragmentation system of claim 1, wherein said computer system includes a processor that executes instructions in each of a privileged mode and a user mode; and     the defragmentor program is realized by way of instructions that execute in the user mode of said processor.

5. The file defragmentation system of claim 4, wherein the alias driver is a virtual device driver that executes in said privileged mode of the processor.

6. The file defragmentation system of claim 5, wherein the file is composed of clusters and the defragmentor program defragments the file by copying clusters of the file from noncontiguous areas of the storage media to a contiguous area of the storage media.

7. The file defragmentation system of claim 6, wherein the alias driver logs conflicting preemptive accesses to a given cluster of the file while the defragmentor program copies the given cluster to the contiguous area.

8. The file defragmentation system of claim 7, wherein the defragmentor program is responsive to the alias driver and the defragmentor program recopies the given cluster to the contiguous area if at least one conflicting access to the given cluster is logged by the alias driver.

9. The file defragmentation system of claim 8, wherein the alias driver translates access attempts to the given cluster as stored in a fragmented area to accesses to the copy of the cluster as stored in the contiguous area while the defragmentor updates the file system structure to reflect the move to the contiguous area.

10. The file defragmentation system of claim 9, wherein the file is a swap file that is used for swapping data between a system memory of said computer system and said media so as to implement a virtual memory that is larger than said system memory of the computer system.

11. The file defragmentation system of claim 10, wherein
the file system structure includes an internal mapping structure for mapping the swap file; and
during a translate mode, the alias driver updates the internal mapping structure for the swap file such that the updated internal mapping structure indicates that a copied cluster of the swap file is located in the contiguous area.

12. A computer-instructing apparatus that provides instructions including a defragmentor routine and an alias driver for execution in a prespecified computer, said computer operating such that control may be pre-emptively taken away from executing routines of said computer, said computer-instructing apparatus being such that:
the defragmentor routine when executed by said computer defragments a file on a storage media by copying original portions of the file to a contiguous area of the media and with each conflict-free copying of a portion the defragmentor routine updates a file system structure to indicate a new location on the storage media for the copied file portion; and
the alias driver when executed by the computer traps pre-emptively attempted accesses to an original portion of the file during the copying of the original portion to the contiguous area and during the updating of the file system structure by the defragmentor routine, and the alias driver maintains coherent access to each conflict-freely copied file portion while the file system structure is updated to define the so-successfully copied file portion as part of the file.

13. The computer-instructing apparatus of claim 12, wherein the alias driver hooks to an input/output system command sent from a file system driver to an input/output system driver.

14. The computer-instructing apparatus of claim 12, wherein the alias driver is inserted into a calling stack of device drivers so as to imitate a device driver that correspond to the storage media.

15. The computer-instructing apparatus of claim 12, wherein the defragmentor routine executes in a user mode of a processor for the computer system, said processor having both the user mode and a privileged mode.

16. The computer-instructing apparatus of claim 15, wherein the alias driver is a virtual device driver that executes in said privileged mode of the processor.

17. The computer-instructing apparatus of claim 16, wherein the defragmentor routine defragments the file by copying clusters of the file from fragmented areas of the storage media to said contiguous area of the storage media.

18. The computer-instructing apparatus of claim 17, wherein the alias driver logs conflicting pre-emptively attempted accesses to a given cluster of the file while the defragmentor routine copies the file cluster to the contiguous area.

19. The computer-instructing apparatus of claim 18, wherein the defragmentor routine recopies from the original file cluster to the contiguous area if at least one conflicting access to the original file cluster occurs during a prior copying of the original file cluster by the defragmentor routine.

20. The computer-instructing apparatus of claim 19, wherein while the defragmentor routine updates the file system structure to define a conflict-freely copied cluster as part of the file, the alias driver translates pre-emptively attempted accesses to the fragmented source of said conflict-freely copied cluster to the corresponding conflict-freely copied cluster in the contiguous area.

21. A file defragmenting system for regrouping discontiguous portions of a file stored in a storage media into a contiguous group while the file is accessible for pre-emptively writing thereto by one or more concurrently executing programs, said defragmenting system comprising:
(a) file-portion specifying means for specifying a discontiguous portion of said file that is to be cloned into a planned area of contiguity;
(b) copying means for making at least a first clone and optionally more clones of the specified file portion in a corresponding part of the planned area of contiguity;
(c) detecting means for detecting one or more pre-emptively intervening writes to the specified file portion during the making of one of said first or more clones; and
(d) retry means for causing the copying means to make a further clone of the specified file portion in the corresponding part of said area if the detecting means detects one or more pre-emptively intervening writes to the specified file portion during the making of an immediately prior clone.

22. A file defragmenting system according to claim 21 further comprising:
(e) directory updating means for updating a directory structure that defines said file to include in the definition of the file, a successfully made clone of said specified file portion, the successfully made clone being one made without the detecting means detecting one or more pre-emptively intervening writes to the specified file portion during the making of the successfully made clone.

23. A file defragmenting system according to claim 22 wherein said file is a swap file that is regularly written to during swapping of data into and out of system memory, said system memory being a higher speed memory than said storage media.

24. A file defragmenting system according to claim 22 wherein said file defragmenting system operates as part of a pre-emptively multi-tasked environment within which control over file access operations is regularly passed to respective ones of plural systems, the file defragmenting system being one of said plural systems.

25. A file defragmenting system according to claim 24 wherein said file defragmenting system operates as part of a multiple privileges environment having a low level privilege mode and a higher level privilege mode and wherein said file defragmenting system is subdivided into a first part operating under the low level privilege mode and a second part operating under the higher level privilege mode the second part communicating with the first part.

26. A file defragmenting system according to claim 22 further comprising:

(f) translating means for redirecting access attempts to the specified file portion to instead access the successfully made clone while the directory updating means is updating the directory structure to include in the definition of the file, said successfully made clone.

27. A file defragmenting method for regrouping discontiguous portions of a file stored in a storage media into a contiguous group while the file is accessible for pre-emptive writing thereto by one or more concurrently executing programs, said defragmenting method comprising the steps of:

(a) specifying a discontiguous portion of said file that is to be cloned into a planned area of contiguity;

(b) making a first clone of the specified file portion in a corresponding part of the planned area of contiguity;

(c) detecting one or more pre-emptively intervening writes, if any, to the specified file portion during the making of said first clone; and (d) making a second clone of the specified file portion in the corresponding part of said area if one or more pre-emptively intervening writes to the specified file portion are detected during the making of the first clone.

28. A file defragmenting method according to claim 27 wherein said file is a swap file that is used for effecting virtual memory by swapping data between system memory and a slower form of storage.

29. A file defragmenting method according to claim 27 further comprising the step of:

(e) updating a directory structure that defines said file to include in the definition of the file, a successfully made clone of said specified file portion, the successfully made clone being one made without detecting one or more intervening writes to the specified file portion during the making of the successfully made clone.

30. A file defragmenting method according to claim 29 further comprising the step of:

(f) redirecting access attempts to the specified file portion to instead access the successfully made clone while the updating of the directory structure proceeds to include in the definition of the file, said successfully made clone.

* * * * *

UNITED STATES PATENT AND TRADEMARK OFFICE
CERTIFICATE OF CORRECTION

PATENT NO. : 5,761,680
DATED : June 2, 1998
INVENTOR(S) : Leonardo Cohen et al.

It is certified that error appears in the above-indentified patent and that said Letters Patent is hereby corrected as shown below:

```
Title page, line [54] and Column 1, line 1, the title should
read:    --COHERENT FILE SYSTEM ACCESS DURING DEFRAGMENTATION
         OPERATIONS ON A STORAGE MEDIUM--
Column 3, line 22, "or" should be --on--; line 37, after
     "(CPU) 12" insert --,--.
Column 4, line 19, "mach-:e." should be --machine--.
```

Signed and Sealed this

Tenth Day of November 1998

*Attest:*

BRUCE LEHMAN

*Attesting Officer*     Commissioner of Patents and Trademarks